(12) United States Patent
Yokoyama (10) Patent No.: US 7,126,719 B2
(45) Date of Patent: Oct. 24, 2006

(54) PRINT PROCESSING METHOD, PRINTING CONTROL SYSTEM AND STORAGE MEDIUM THEREFOR

(75) Inventor: Tetsuya Yokoyama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 977 days.

(21) Appl. No.: 09/736,344

(22) Filed: Dec. 15, 2000

(65) Prior Publication Data

US 2001/0006424 A1    Jul. 5, 2001

(30) Foreign Application Priority Data

Dec. 27, 1999    (JP) ................... 11-371416

(51) Int. Cl.
   B41J 1/00      (2006.01)
   G06F 15/00     (2006.01)
   G06K 1/00      (2006.01)
(52) U.S. Cl. .............. 358/1.9; 358/1.14; 358/1.15; 358/1.16; 358/1.12; 709/238; 718/103
(58) Field of Classification Search ............ 358/1.16, 358/1.15, 1.17, 1.13, 1.14, 1.12, 1.9; 395/112, 395/114; 399/81; 710/6; 709/238; 718/103
See application file for complete search history.

(56) References Cited

U.S. PATENT DOCUMENTS

| 5,901,276 A * | 5/1999 | Murahashi et al. ......... 358/1.13 |
| 5,974,232 A * | 10/1999 | Kamiya ....................... 709/238 |
| 6,081,342 A * | 6/2000 | Nakai et al. ................ 358/1.16 |
| 6,332,170 B1 * | 12/2001 | Ban .............................. 710/6 |
| 6,351,315 B1 * | 2/2002 | Kusumoto .................. 358/1.14 |
| 6,421,509 B1 * | 7/2002 | Nomura et al. ................ 399/81 |
| 6,512,592 B1 * | 1/2003 | Simpson et al. ........... 358/1.15 |
| 6,559,965 B1 * | 5/2003 | Simpson et al. ........... 358/1.15 |
| 6,614,545 B1 * | 9/2003 | Langer et al. .............. 358/1.15 |
| 6,651,081 B1 * | 11/2003 | Salgado et al. ............. 718/103 |
| 6,665,088 B1 * | 12/2003 | Chiba et al. ................ 358/1.17 |
| 6,678,068 B1 * | 1/2004 | Richter et al. ............. 358/1.15 |
| 6,724,494 B1 * | 4/2004 | Danknick ................... 358/1.14 |
| 6,744,527 B1 * | 6/2004 | Dorsey et al. .............. 358/1.12 |
| 6,894,792 B1 * | 5/2005 | Abe .......................... 358/1.15 |

\* cited by examiner

Primary Examiner—Kimberly Williams
Assistant Examiner—Satwant Singh
(74) Attorney, Agent, or Firm—Fitzpatrick, Cella, Harper & Scinto (57) ABSTRACT

Print information that has been generated by a first device is submitted to a second device and a print job is started (S101). Whether a failure has occurred on the side of the first device during the submission of the print information is detected (S102). In accordance with the detection made, it is determined to abort, suspend or resume processing of the print job that is currently being submitted. In accordance with the determination made, abort, suspension or resumption of processing is reported to the second device, which receives the print information, as notification of control of the print job (S105, S107, S109). This printing control method is such that if processing of print information is suspended owing to occurrence of a failure, the source (the first device) that submits the print information reports suspension to a remote device (the second device) that is the destination of the print information. It is possible to exercise control so as to resume print processing in response to elimination of any failure.

18 Claims, 4 Drawing Sheets

PRINT PROCESSING METHOD, PRINTING CONTROL SYSTEM AND STORAGE MEDIUM THEREFOR

FIELD OF THE INVENTION

The present invention relates to a printing job performed by a copier, etc., which executes print processing upon being connected to a network, a print processing method for implementing the job, a printing control system for executing this method, and a storage medium storing program code for executing this method by computer.

BACKGROUND OF THE INVENTION

When print information that has been generated at the submitting source of a print job such as a host computer is subjected to print processing by a printer remotely connected via a network, the printer exchanges print information with the host computer and executes the prescribed print processing. If the source (a host computer in this case) submitting a print job develops a failure while the print job is being submitted to the host computer and, as a result, processing for submitting the print job can no longer continue, this processing is suspended without notifying the printer of such suspension.

Assume that when a print job is being submitted to a network-connected printer, the source submitting the print job develops a failure and the submission of the job is suspended. If in such case the print job is suspended without notifying the printer to which the print information is to be submitted, the processing of the print job continues being executed on the printer side. Since this print job cannot be completed normally, a condition arises in which the processing of other ensuing print jobs cannot be executed. The result is a decline in operating efficiency.

SUMMARY OF THE INVENTION

The present invention has been proposed to solve the problems of the prior art and has as its object to provide a print processing method having a high operating efficiency, a computer-readable storage medium storing a program that makes it possible to execute this method by computer, and a printing control system.

Specifically, the present invention provides a print processing method for executing print processing upon exchanging print information with a device connected via a network, comprising: a step of submitting print information, which has been generated by one device, to another device and starting a print job; a detection step of detecting whether a failure has occurred on the side of the one device during the submission of the print information; a step of determining to abort, suspend or resume processing of a print job, which is currently being submitted, in accordance with the detection made at the detection step; and a step of reporting abort, suspension or resumption of processing to the other device, which receives the print information, as notification of control of the print job in accordance with the determination made.

The present invention further provides a print processing method for executing print processing upon exchanging print information with a device connected via a network, comprising: a step of receiving print information, which has been generated by one device, at another device and starting a print job based upon the print information received; a step of receiving notification of control of the print job reported from the side of the one device during processing of the print job started; a step of determining to suspend or resume the print job on the basis of the received notification of control of the print job; and if a print job is submitted during suspension of the first-mentioned print job, a step of executing processing of the other print job until the first-mentioned print job is resumed.

The present invention further provides a storage medium storing a program for executing print processing upon exchanging print information with a device connected via a network, the program having: code of a step of submitting print information, which has been generated by one device, to another device and starting a print job; code of a detection step of detecting whether a failure has occurred on the side of the one device during the submission of the print information; code of a step of determining to abort, suspend or resume processing of a print job, which is currently being submitted, in accordance with the detection made at the detection step; and code of a step of reporting abort, suspension or resumption of processing to the other device, which receives the print information, as notification of control of the print job in accordance with the determination made.

The present invention further provides a storage medium storing a program for executing print processing upon exchanging print information with a device connected via a network, comprising: code of a step of receiving print information, which has been generated by one device, at another device and starting a print job based upon the print information received; code of a step of receiving notification of control of the print job reported from the side of the one device during processing of the print job started; code of a step of determining to suspend or resume the print job on the basis of the received notification of control of the print job; and if a print job is submitted during suspension of the first-mentioned print job, code of a step of executing processing of the other print job until the first-mentioned print job is resumed.

A printing control system for executing print processing upon exchanging print information with a device connected via a network, comprising: means for submitting print information, which has been generated by one device, to another device and starting a print job; detection means for detecting whether a failure has occurred on the side of the one device during the submission of the print information; means for determining to abort, suspend or resume processing of a print job, which is currently being submitted, in accordance with the detection made by the detection means; and means for reporting abort, suspension or resumption of processing to the other device, which receives the print information, as notification of control of the print job in accordance with the determination made.

A printing control system for executing print processing upon exchanging print information with a device connected via a network, comprising: means for receiving print information, which has been generated by one device, at another device and starting a print job based upon the print information received; means for receiving notification of control of the print job reported from the side of the one device during processing of the print job started; means for determining to abort, suspend or resume the print job on the basis of the received notification of control of the print job; and means which, if another print job is submitted during suspension of the first-mentioned print job, is for executing processing of the other print job until the first-mentioned print job is resumed.

The present invention further provides a printing control apparatus for transmitting print information via a network to cause another apparatus to perform printing, comprising: submitting means for submitting a print job to the other apparatus, the print job consisting of print information that has been generated by scanning in a document; and command transmitting means for transmitting a command to abort processing of a currently submitted print job to the other apparatus in accordance with a failure that has occurred in the printing control apparatus during submission of the print job.

The present invention further provides a printing control apparatus for transmitting print information via a network to cause another apparatus to perform printing, comprising: submitting means for submitting a print job to the other apparatus, the print job consisting of print information that has been generated by scanning in a document; and command transmitting means for transmitting a command to suspend processing of a currently submitted print job to the other apparatus in accordance with a failure that has occurred in the printing control apparatus during submission of the print job.

The present invention further provides a printing control apparatus for transmitting print information via a network to cause another apparatus to perform printing, comprising: submitting means for submitting a print job to the other apparatus, the print job consisting of print information that has been generated by scanning in a document; determination means for determining whether to abort or suspend processing of a currently submitted print job in accordance with a failure that has occurred in the printing control apparatus during submission of the print job; and command transmitting means for transmitting a command to abort or a command to suspend processing of a currently submitted print job to the other apparatus in accordance with the determination made by the determination means.

The present invention further provides a printing control method for transmitting print information via a network to cause another apparatus to perform printing, comprising: a submitting step of submitting a print job from one apparatus to the other apparatus, the print job consisting of print information that has been generated by scanning in a document; and a command transmitting step of transmitting a command to abort processing of a currently submitted print job from the one apparatus to the other apparatus in accordance with a failure that has occurred in the one apparatus during submission of the print job.

The present invention further provides a printing control method for transmitting print information via a network to cause another apparatus to perform printing, comprising: a submitting step of submitting a print job from one apparatus to the other apparatus, the print job consisting of print information that has been generated by scanning in a document; and a command transmitting step of transmitting a command to suspend processing of a currently submitted print job from the one apparatus to the other apparatus in accordance with a failure that has occurred in the one apparatus during submission of the print job.

The present invention further provides a printing control method for transmitting print information via a network to cause another apparatus to perform printing, comprising: a submitting step of submitting a print job from one apparatus to the other apparatus, the print job consisting of print information that has been generated by scanning in a document; a determination step of determining whether to abort or suspend processing of a currently submitted print job in accordance with a failure that has occurred in the one apparatus during submission of the print job; and a command transmitting step of transmitting a command to abort or a command to suspend processing of a currently submitted print job from the one apparatus to the other apparatus in accordance with the determination made by the determination means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE PREFERRED EMBODIMENT

A preferred embodiment of the present invention will now be described in detail in accordance with the accompanying drawings.

A print processing method according to a preferred embodiment of the invention will now be described with reference to the drawings. Print information that has been generated at the submitting source of a print job such as a host computer or copier is processed by a print processing device (referred to below as a "remote device") remotely connected via a network. A method for submitting print information to a remote device and processing the print information shall be referred to as a "remote printing method".

Figure 1:
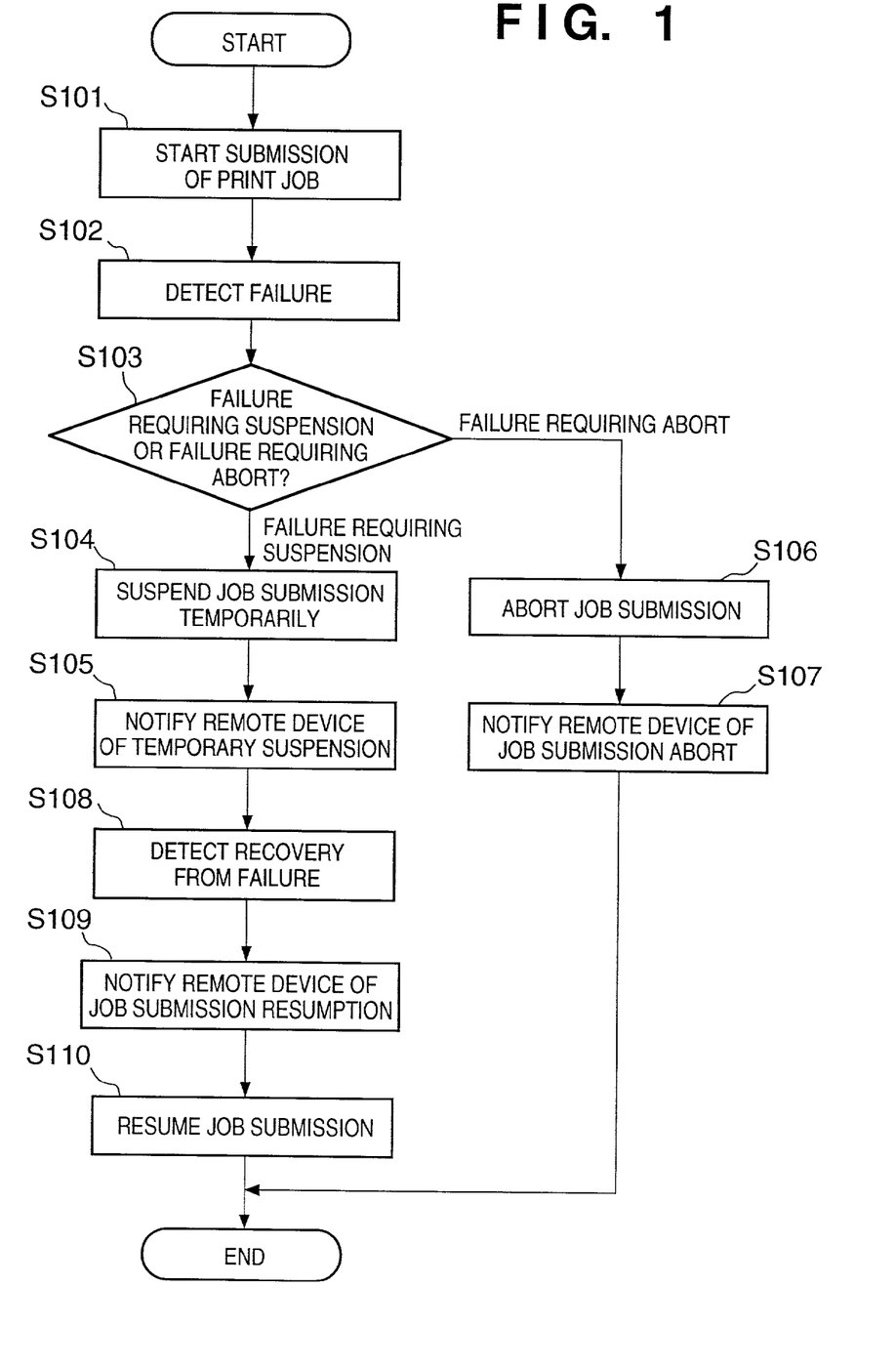
FIG. 1 is a flowchart useful in describing the flow of the operation of a device that is the source of submission of a print job in an embodiment of the present invention.
Figure 2:
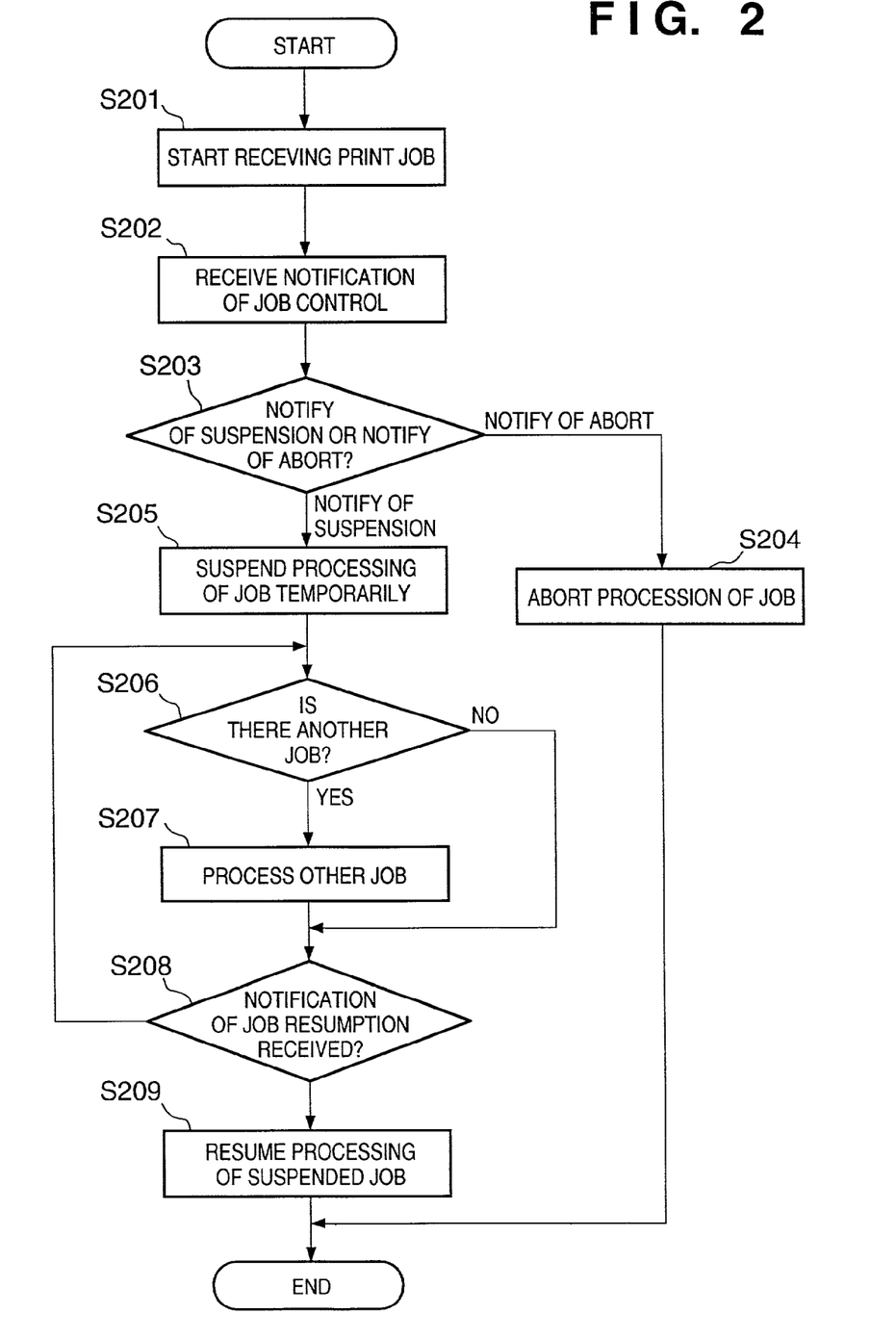
FIG. 2 is a flowchart useful in describing the flow of the operation on the side of a device (a remote device) remotely connected to a network in an embodiment of the present invention.

FIG. 1 is a flowchart illustrating the flow of the operation of a device that is the source of submission of a print job in a print processing method, and FIG. 2 is a flowchart illustrating the flow of operation on the side of a remote device in the print processing method.

Figure 3:
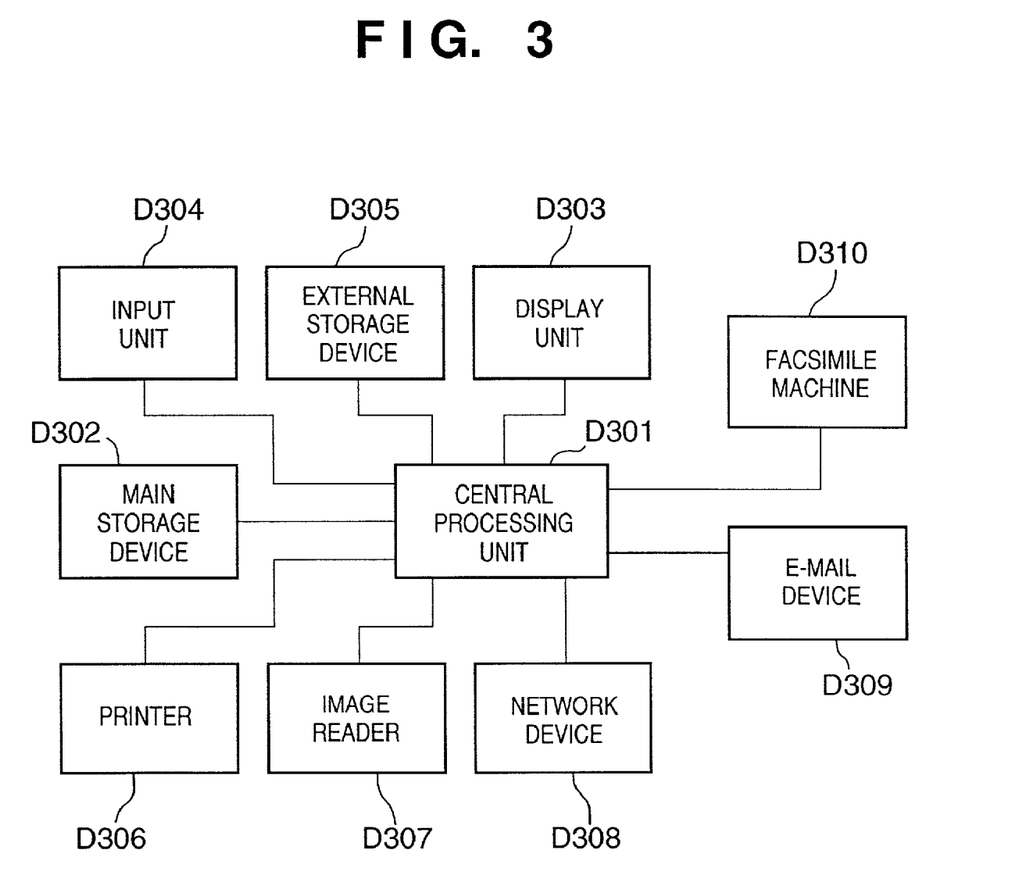
FIG. 3 is a block diagram illustrating the hardware configuration of a copier to which a remote printing method is applied.

FIG. 3 is a block diagram illustrating the configuration of hardware for executing a remote printing method according to a preferred embodiment of the present invention. The hardware includes, as principal components, a central processing unit D301, a main storage device D302, a display unit D303, an input unit D304, an external storage device D305, a printer D306, an image reader D307, a network device D308, an e-mail device D309 and a facsimile machine D310.

The central processing unit D301 controls the main storage device D302, the display unit D303, the input unit D304, the external storage device D305, the printer D306, the image reader D307, the network device D308, the e-mail device D309 and the facsimile machine D310, executes the four arithmetical operations and logical operations.

The main storage device D302 stores information necessary for this information processing system to execute information processing and is capable of having this information extracted from it as necessary.

The display unit D303, which is for displaying results of processing, such as figures or text, may be a CRT, liquid-crystal panel or touch-sensitive panel, etc. The input unit D304, which is for making various inputs to the central processing unit D301, may be a keyboard, a mouse, a card reader or a touch-sensitive panel, etc.

The external storage device D305, which is for storing various information, may be a magnetic storage device or a magneto-optic storage device, etc. The external storage device has a database for storing notification-destination information indicative of each failure and frequency of occurrence thereof.

The printer D306 prints processed results such as figures or text, and the image reader D307 converts a paper document to electronic information. According to this embodiment, the image reader is equipped with an automatic feeder for reading a plurality of documents automatically. The network device D308 is connected to a computer network and to the present hardware.

The e-mail device D309 sends and receives e-mail to and from the outside through the computer network.

Figure 4:
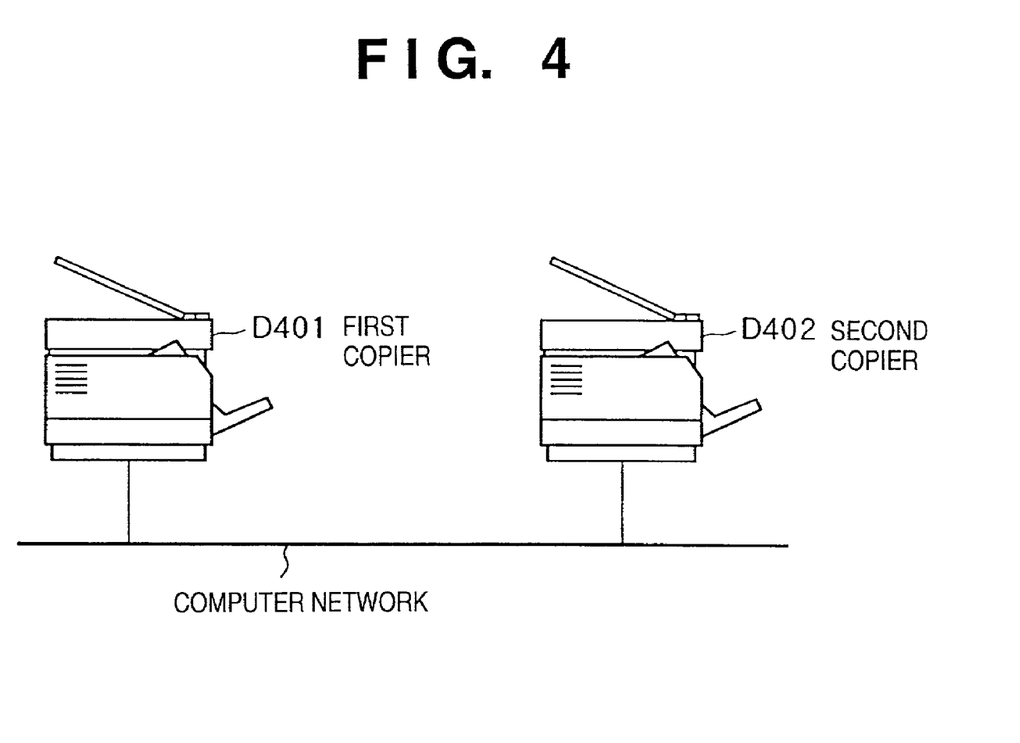
FIG. 4 is a diagram showing the configuration of a system to which a remote printing method is applied.

FIG. 4 is a diagram showing the configuration of hardware constructed on a network to which the remote printing method of this embodiment is applied. According to this embodiment, a first copier D401 is used as a source which submits a print job and a second copier D402 is used as a remote device. It goes without saying, however, that the present invention is not limited to copiers and covers print processing devices such as facsimile machines and the like.

Processing will be described in terms of operation of the source that submits a remote print job and operation on the side of the remote device.

<Operation of Source that Submits Remote Print Job

Reference will be had to the flowchart of FIG. 1 to describe the remote printing method of this embodiment, namely an example in which a multiple-page document is scanned on the side of the first copier using an automatic feeder, the images are submitted to the second copier D402 and are processed as a remote print job by the second copier.

The user first starts the remote print job at the source, namely the first copier D401. In response, the multiple-page document is scanned by the first copier using the automatic feeder, the image data are transmitted to the second copier D402 and submission of a remote print job starts (step S101 in FIG. 1).

Next, if a failure of some kind occurs in the first copier, the failure is detected (step S102). It is then determined whether the detected failure is one for which the submission of the print job should be suspended temporarily or aborted (step S103).

If it is determined at step S103 that the failure is one for which the submission of the print job should be aborted, then the submission of the print job is aborted (step S106) and the second copier is notified of the fact that the remote print job has been aborted (step S107). More specifically, a command that the remote print job has been aborted is transmitted to the second copier.

If it is determined at step S103 that the failure is one for which the submission of the print job should be suspended temporarily, then the submission of the print job is suspended temporarily (step S104). In this embodiment, paper jamming that occurs when printing paper is pulled in by the automatic feeder of the first copier is assumed to be a failure for which the submission of the print job should be suspended temporarily. After submission of the print job is suspended temporarily at step S104, the second copier is notified to this effect (step S105). More specifically, a command that the print job is suspended temporarily is transmitted to the second copier.

If the user unjams the automatic feeder and thus eliminates the cause of job suspension, the first copier detects recovery from failure (S108) and notifies the second copier that submission of the print job has resumed (S109). More specifically, a command that the submission of the print job has resumed is transmitted to the second copier. The second copier responds by resuming submission of the suspended print job.

The foregoing is the flow of processing on the side that submits the print job.

At the decision step S103 where processing branches, a distinction between "SUSPEND" and "ABORT" is made. The conceptual difference between these is as follows: "SUSPEND" means that processing can be resumed by eliminating the cause of a failure, while "ABORT" means that processing will not be resumed regardless of whether the cause of a failure exists or not.

The decision as to whether processing should be suspended or aborted is made by the central processing unit D301. The decision depends upon the level of the failure that has occurred. In case of a minor failure from which recovery can be made promptly, the decision rendered is suspension from which job resumption can be made. In case of a failure the level of which does not allow prompt recovery, the decision rendered is to abort the print job. Further, what measures are to be taken in case of suspension or abort may be stored in the main storage devices D302, D305 in accordance with the content of the failure. The operator may specify this using the input unit D304 if desired.

<Operation on Side of Remote Device>

Processing on the side of the remote device will now be described with reference to the flowchart of FIG. 2.

First, a print job is received from the first copier D401 and processing is started (S201). Next, the remote device receives notification of control of the print job in response to a failure that has occurred in the first copier (step S202). Next, it is determined whether notification of control of the print job received at step S202 is notification of temporary suspension or notification to abort the submission of the print job (step S203).

If it is determined at step S203 that the submission of the print job is to be aborted, then processing of the print job is aborted at step S204.

On the other hand, if it is determined at step S203 that the submission of the print job is to be suspended temporarily, then processing of the print job is suspended temporarily at step S205. This is followed by step S206, at which it is determined whether another print job to be executed has been spooled. It is determined at step S206 that another print job has been spooled, then processing of this other print job commences (step S207). Following completion of the other print job, it is determined whether notification to resume the submission of the temporarily suspended print job has been received (step S208).

If it is determined at step S208 that notification to resume submission of the print job has not been received, whether or not there is another print job is determined again at step S206.

If it is determined at step S208 that notification to resume submission of the print job has been received, processing of the print job that was temporarily suspended is resumed (step S209).

The foregoing is the flow of processing on the side of the remote device.

<Remote Printing by Multiple Printing Devices>

The foregoing relates to a case where the source (the first copier) that submits a print job submits a print job only to a single remote device (the second copier). However, it is also conceivable that the source submitting a print job will submit the same print job to a plurality of remote devices (second and third copiers). In such case the source submitting the print job would notify the plurality of remote devices of temporary suspension or of job-submission abort.

A case where the user wishes to have a plurality of remote devices perform remote printing will be described on the basis of FIG. 1.

When a document is scanned in by the first copier at step S101 in FIG. 1, the first copier transmits this image data to the second and third copiers to start the submission of the remote print job. At this time the first copier copies the image data and transmits it to each of the second and third copiers. Alternatively, using multicast communication over the network, the first copier may transmit the image data by adopting, as destination addresses, multicast addresses indicative of the second and third copiers. Further, the fact that the image data has been transmitted to the second and third copiers is registered in a list beforehand.

At step S106, abort is reported to the second and third copiers on the basis of the list. More specifically, the first copier sends the second and third copiers a command indicating that submission of the print job is to be aborted.

Similarly, at step S105, temporary suspension is reported to the second and third copiers on the basis of the list. More specifically, the first copier sends the second and third copiers a command indicating that submission of the print job is to be suspended temporarily. At step S109, resumption is reported to the second and third copiers on the basis of the list. More specifically, the first copier sends the second and third copiers a command indicating that submission of the print job is to be resumed.

The present invention can be applied to a system constituted by a plurality of devices (e.g., a host computer, interface, reader, printer, etc.) or to an apparatus comprising a single device (e.g., a copier or facsimile machine, etc.).

Furthermore, it goes without saying that the object of the invention is attained also by supplying a storage medium storing the program codes of the software for performing the functions of the foregoing embodiment to a system or an apparatus, reading the program codes with a computer (e.g., a CPU or MPU) of the system or apparatus from the storage medium, and then executing the program codes. In this case, the program codes read from the storage medium implement the novel functions of the embodiment and the storage medium storing the program codes constitutes the invention. Furthermore, besides the case where the aforesaid functions according to the embodiment are implemented by executing the program codes read by a computer, it goes without saying that the present invention covers a case where an operating system or the like running on the computer performs a part of or the entire process in accordance with the designation of program codes and implements the functions according to the embodiment.

It goes without saying that the present invention further covers a case where, after the program codes read from the storage medium are written in a function expansion card inserted into the computer or in a memory provided in a function expansion unit connected to the computer, a CPU or the like contained in the function expansion card or function expansion unit performs a part of or the entire process in accordance with the designation of program codes and implements the function of the above embodiment.

In a case where the present invention is applied to the above-mentioned storage medium, program code corresponding to the flowcharts (shown in FIG. 1 and/or FIG. 2) described earlier would be stored on the storage medium.

Thus, in accordance with the present invention, as described above, the arrangement is such that if, when a print job is submitted to a remote device, the source that submitted the print job develops a failure and submission of the print job is suspended as a consequence, the remote device is so notified, thereby making it possible to suspend the processing of the print job temporarily on the side of the remote device. As a result, the print job will not continue to be processed on the side of the remote device. During the time that the submission of the print job is suspended, therefore, another job can be executed by the remote device. This makes it possible to raise operating efficiency.

As many apparently widely different embodiments of the present invention can be made without departing from the spirit and scope thereof, it is to be understood that the invention is not limited to the specific embodiments thereof except as defined in the appended claims.

What is claimed is:

1. A print processing method for executing print processing upon exchanging print information with a device connected via a network, comprising:

a step of submitting print information, which has been generated by one device, to another device and starting a first print job;

a detection step of detecting whether a failure has occurred on the side of the one device during the submission of the print information;

a step of determining to abort or suspend processing of the first print job, which is currently being submitted, in accordance with the detection made in said detection step;

a step of reporting abort or suspension of processing to the other device, which receives the print information;

a step of aborting the processing of the first print job in the other device according to receipt of the notice which indicates abort;

a step of suspending the processing of the first print job in the other device according to receipt of the notice which indicates suspension;

a step of processing a second pint job which differs from the first print job, after the processing of the first print job has been suspended in said step of suspending; and a step of resuming processing of the first print job according to recovery of the failure which occurred on the side of the one device, after the second print job has been processed in said step of processing, wherein said step of resuming resumes the processing of the first print job without receiving a user's instruction.

2. The method according to claim 1, wherein, in a case where a failure that occurred is eliminated at detection performed in said step for detecting whether a failure has occurred, said determining step includes determining to resume processing of the suspended print job.

3. The method according to claim 1, further comprising:

a step of determining whether a notice which indicates resumption is received, after the second print job has been processed; and a step of processing, the first print job in a case where the notice is received, or a third print job in a case where the notice is not received, based on the determination in said step of determining.

4. The method according to claim 1, wherein said step of determining determines to abort or suspend the processing based on information of a memory which stores information of the failure to be aborted and the failure to be suspended.

5. The method according to claim 1, wherein said step of determining determines to abort or suspend the processing based on a user's instruction.

6. A computer-readable storage medium storing a program for executing print processing upon exchanging print information with a device connected via a network, the program having:
   code of a step of submitting print information, which has been generated by one device, to another device and starting a first print job;
   code of a detection step of detecting whether a failure has occurred on the side of the one device during the submission of the print information;
   code of a step of determining to abort or suspend processing of the first print job, which is currently being submitted, in accordance with the detection made by said code of the detection step;
   code of a step of reporting abort or suspension of processing to the other device, which receives the print information;
   code of a step of aborting the processing of the first print job in the other device according to receipt of the notice which indicates abort;
   code of a step of suspending the processing of the first print job in the other device according to receipt of the notice which indicates suspension;
   code of a step of processing a second print job which differs from the first print job, after the processing of the first print job has been suspended by said code of the suspending step; and
   code of a step of resuming processing of the first print job according to recovery of the failure which occurred on the side of the one device, after the second print job has been processed by said code of the processing step,
   wherein said code of the step of resuming resumes the processing of the first print job without receiving a user's instruction.

7. The storage medium according to claim 6, wherein, in a case where a failure that occurred is eliminated at detection performed by the code of said step for detecting whether a failure has occurred, the code of said determining step determines to resume processing of the suspended print job.

8. The storage medium according to claim 6, further comprising:
   code of a step of determining whether a notice which indicates resumption is received, after the second print job has been processed; and
   code of a step of processing, the first print job in a case where the notice is received, or a third print job in a case where the notice is not received, based on the determination by said code of the step of determining.

9. The storage medium according to claim 6, wherein said code of the step of determining determines to abort or suspend the processing based on information of a memory which stores information of the failure to be aborted and the failure to be suspended.

10. The storage medium according to claim 6, wherein said code of the step of determining determines to abort or suspend the processing based on a user's instruction.

11. A printing control system, which includes a first device and a second device, for executing print processing upon exchanging print information with a device connected via a network,
   said first device comprising:
      means for submitting print information, which has been generated by the first device, to the second device and starting a first print job;
      detection means for detecting whether a failure has occurred on the side of the first device during the submission of the print information;
      means for determining to abort or suspend processing of the first print job, which is currently being submitted, in accordance with the detection made by said detection means;
      means for reporting abort or suspension of processing to the second device, which receives the print information; and
   said second device comprising:
      means for aborting the processing of the first print job in the other device according to the receipt of the notice which indicates abort;
      means for suspending the processing of the first print job in the other device according to receipt of the notice which indicates suspension;
      means for processing a second print job which differs from the first print job, after the processing of the first print job has been suspended by said suspending means; and
      means for resuming processing of the first print job, after the second print job has been processed by said processing means,
   wherein said means for resuming resumes the processing of the first print job without receiving a user's instruction.

12. The system according to claim 11, wherein, in a case where a failure that occurred is eliminated at detection performed by said means for detecting whether a failure has occurred, said determining means determines to resume processing of the suspended print job.

13. The system according to claim 11, wherein devices connected via the network include a copier.

14. The printing control system according to claim 11, said second device further comprising:
   means for determining whether a notice which indicates resumption is received, after the second print job has been processed; and
   means for processing the first print job in a case where the notice is received, or a third print job in a ease where the notice is not received, based on the determination by said means for determining.

15. The printing control system according to claim 11, wherein said means for determining determines to abort or suspend the processing based on information of a memory which stores information of the failure to be aborted and the failure to be suspended.

16. The printing control system according to claim 11, wherein said means for determining determines to abort or suspend the processing based on a user's instruction.

17. A first printer capable of executing print processing of a first print job transmitted from a second printer, said first printer comprising:
   means for suspending the print processing of the first print job in said first printer, in a case where said first printer receives notice which indicates suspension of the print processing of the first print job and is transmitted from said second printer; and means for executing the print processing of the first print job without receiving a user's instruction after completion of print processing of a second print job, in a case where said first printer receives the notice and the second print job which differs from the first print job and is transmitted from said second printer.

18. A print processing method executed by a system, which includes a first printer capable of executing print processing of a first print job transmitted from a second printer, said method comprising:

a step of suspending the print processing of the first print job in said first printer, in a case where said first printer receives notice which indicates suspension of the print processing of the first print job and is transmitted from said second printer;

a step of executing the print processing of the first print job without receiving a user's instruction after completion of print processing of a second print job, in a case where said first printer receives the notice and the second print job which differs from the first print job and is transmitted from said second printer.

* * * * *